(12) United States Patent
Nishino

(10) Patent No.: US 8,113,080 B2
(45) Date of Patent: Feb. 14, 2012

(54) NEUTRAL HOLD DEVICE FOR HYDROSTATIC CONTINUOUSLY VARIABLE SPEED CHANGE DEVICE

(75) Inventor: Akifumi Nishino, Sakai (JP)

(73) Assignee: Kubota Corporation, Osaka (JP)

( * ) Notice: Subject to any disclaimer, the term of this patent is extended or adjusted under 35 U.S.C. 154(b) by 999 days.

(21) Appl. No.: 12/051,825

(22) Filed: Mar. 19, 2008

(65) Prior Publication Data

US 2009/0044652 A1    Feb. 19, 2009

(30) Foreign Application Priority Data

Aug. 16, 2007    (JP) ................................ 2007-212348

(51) Int. Cl.
*G05G 9/00* (2006.01)
(52) U.S. Cl. ................ 74/473.16; 74/473.25; 74/473.28
(58) Field of Classification Search ................ 74/473.1, 74/473.11, 473.21, 473.23–473.25, 473.3, 74/473.36
See application file for complete search history.

(56) References Cited

U.S. PATENT DOCUMENTS

| 3,863,520 A * | 2/1975 | Moline et al. .............. 74/473.23 |
| 4,140,436 A * | 2/1979 | Schumacher et al. .......... 417/27 |
| 4,485,689 A * | 12/1984 | Cambria .................... 74/473.21 |
| 5,207,740 A * | 5/1993 | Ikushima et al. .......... 192/220.6 |
| 5,263,385 A * | 11/1993 | Hirata et al. .................... 74/481 |
| 6,347,560 B1 * | 2/2002 | Maezawa et al. .......... 74/473.16 |
| 7,458,438 B2 * | 12/2008 | Nishino et al. ................ 180/305 |

FOREIGN PATENT DOCUMENTS

| JP | 56-009121 U | 1/1981 |
| JP | 07089363 A | 4/1995 |
| JP | 2001-277888 A | 10/2001 |

* cited by examiner

*Primary Examiner* — Raymond Addie
(74) *Attorney, Agent, or Firm* — The Webb Law Firm

(57) ABSTRACT

A neutral hold device for a hydrostatic continuously variable speed change device having a trunnion shaft, comprising a first member which rotates integrally with the trunnion shaft and in which a cam having a concave part is formed; a second member that pivots about a support shaft provided parallel to the trunnion shaft, and that is provided with a cam follower for engaging with the cam; a spring for urging the cam follower against the cam so that the trunnion shaft is retained in a neutral position by the cam follower being positioned in a set position of the cam by the urging of the spring; and auxiliary urging means for generating an auxiliary urging force for urging the trunnion shaft toward the neutral position while the trunnion shaft is positioned in a proximate region of the neutral position set in advance.

3 Claims, 9 Drawing Sheets

NEUTRAL HOLD DEVICE FOR HYDROSTATIC CONTINUOUSLY VARIABLE SPEED CHANGE DEVICE

BACKGROUND OF THE INVENTION

1. Field of the Invention

The present invention relates to a neutral hold device for a hydrostatic continuously variable speed change device.

2. Description of the Related Art

In a neutral hold device for a hydrostatic continuously variable speed change device such as the one mentioned above, an operating arm is linked to a speed change pedal or other speed shifter via a linking mechanism. In a neutral hold device, the operating arm rotates integrally with a trunnion shaft while pushing out a cam follower (roller) from the bottom of the arm cam through the operation of the speed shifter against the urging of a spring. The speed of the hydrostatic continuously variable speed change device is thereby changed according to the operation direction and amount of operation from the neutral position of the speed shifter, and the arm is pivoted by the urging of the spring in conjunction with the withdrawal of operation of the speed shifter so that the cam follower faces the bottom of the cam. The operating arm rotates integrally with the trunnion shaft toward the neutral position in conjunction with the pivoting action, whereby the trunnion shaft is returned to the neutral position, and the hydrostatic continuously variable speed change device is placed in the neutral state (see JP 2001-277888, for example).

In the configuration described above, when the urging force of the spring decreases due to changes that occur over time, the trunnion shaft returns near the neutral position through the urging of the spring when operation of the speed shifter is withdrawn, but the trunnion shaft may no longer return to the neutral position. The trunnion shaft also ceases to return to the neutral position in such cases as when the viscosity of the hydraulic oil in the hydrostatic continuously variable speed change device is increased by a decrease in the ambient temperature.

In other words, reduction of the spring force due to changes that occur over time, increased viscosity of the hydraulic oil due to decreased ambient temperature, and other effects can lead to drawbacks whereby the neutral state of the hydrostatic continuously variable speed change device is no longer obtained. Increasing the urging force of the spring is one method of preventing this drawback, but the speed change operation of the hydrostatic continuously variable speed change device against the urging of the spring becomes too stiff in this case. Drawbacks therefore occur in that the operability of the hydrostatic continuously variable speed change device is reduced.

SUMMARY OF THE INVENTION

An object of the present invention is to provide an improved neutral hold device.

The neutral hold device for a hydrostatic continuously variable speed change device having a trunnion shaft according to an aspect of the present invention comprises a first member which rotates integrally with the trunnion shaft and in which a cam having a concave part is formed; a second member that pivots about a support shaft provided parallel to the trunnion shaft, and that is provided with a cam follower for engaging with the cam; a spring for urging the cam follower against the cam so that the trunnion shaft is retained in a neutral position by the cam follower being positioned in a set position of the cam by the urging of the spring; and auxiliary urging means for generating an auxiliary urging force for urging the trunnion shaft toward the neutral position while the trunnion shaft is positioned in a proximate region of the pre-set neutral position.

According to this characteristic configuration, the auxiliary urging force of the auxiliary urging means acts on the trunnion shaft while the trunnion shaft is positioned in the proximate region of the pre-set neutral position. Therefore, the urging force of the spring and the auxiliary urging force of the auxiliary urging means act on the trunnion shaft.

While the trunnion shaft is not positioned in the proximate region of the pre-set neutral position, e.g., while the trunnion shaft is positioned in a region farther from the neutral position than the proximate region, the auxiliary urging force of the auxiliary urging means does not act on the trunnion shaft, and therefore only the urging force of the spring acts on the trunnion shaft.

In other words, the urging force for urging the trunnion shaft toward the neutral position can be strengthened by the action of the auxiliary urging force only while the trunnion shaft is positioned in the proximate region of the pre-set neutral position.

Through this configuration, when the operation of the speed shifter is withdrawn, even when reduction of the urging force of the spring due to use and passage of time, increased viscosity of the hydraulic oil due to reduced ambient temperature, and other effects make it difficult to return the trunnion shaft to the neutral position merely by the urging force of the spring, the auxiliary urging force of the auxiliary urging means acts as an urging force for returning the trunnion shaft to the neutral position when the trunnion shaft has been returned to the proximate region of the neutral position by the urging force of the spring. As a result, the trunnion shaft can be reliably returned to the neutral position regardless of reduction of the urging force of the spring due to use and passage of time, increased viscosity of the hydraulic oil due to reduced ambient temperature, and other effects.

Since the auxiliary urging force of the auxiliary urging means acts on the trunnion shaft only while the trunnion shaft is positioned in the proximate region of the pre-set neutral position, the speed change operation of the hydrostatic continuously variable speed change device is stiffened by the auxiliary urging force of the auxiliary urging means for a short time when the trunnion shaft is positioned in the proximate region of the preset neutral position, but the stiffening of the speed change operation of the hydrostatic continuously variable speed change device due to the auxiliary urging force of the auxiliary urging means can be prevented from occurring while the trunnion shaft is outside of the proximate region of the neutral position.

Consequently, the inconvenience that occurs when the hydrostatic continuously variable speed change device can no longer be placed in the neutral state because of changes over time, reduced ambient temperature, and other effects can be effectively prevented without reducing the operability of the hydrostatic continuously variable speed change device.

In an aspect of the present invention, the auxiliary urging means is preferably configured so as to generate the auxiliary urging force by pivotally urging the second member so that the cam follower faces the set position of the cam while the trunnion shaft is positioned in the proximate region.

According to this configuration, the first member in which the cam is formed, or the second member provided with the cam follower, can be jointly used as a constituent part of the auxiliary urging means. The number of parts can thereby be reduced in comparison with a case in which a member corresponding to the first member or second member is newly provided.

In an aspect of the present invention, the auxiliary urging means has an auxiliary cam formed in the second member; a contacting member for coming in contact with the auxiliary cam; and an auxiliary spring for urging the contacting member toward the auxiliary cam; and the auxiliary cam is formed such that the auxiliary urging force is generated from an urging force of the auxiliary spring while the trunnion shaft is positioned in the proximate region, and the auxiliary urging force is not generated from the urging force of the auxiliary spring while the trunnion shaft is not positioned in the proximate region.

According to this configuration, since the second member originally provided to the neutral hold device is utilized to form an auxiliary cam, the number of parts can be reduced in comparison with a case in which a cam member is newly provided for use only in forming the auxiliary cam.

In an aspect of the present invention, the neutral hold device further comprises adjustable means for adjusting the auxiliary urging force.

According to this configuration, when the auxiliary urging force of the auxiliary urging means decreases due to the passage of time or other effects, the auxiliary urging force can be adjusted to the appropriate size by the adjusting means.

Consequently, the inconvenience that occurs when the hydrostatic continuously variable speed change device can no longer be placed in the neutral state because of changes occurring over time, reduced ambient temperature, and other effects can be effectively prevented over a long period of time without reducing the operability of the hydrostatic continuously variable speed change device.

DESCRIPTION OF THE PREFERRED EMBODIMENTS

An embodiment in which the neutral hold device 2 for a hydrostatic continuously variable speed change device 1 according to the present invention is applied to a tractor as an example of a work vehicle will be described hereinafter based on the drawings as an example of a preferred embodiment of the present invention. The device 2 also functions as a neutral-position return device for a hydrostatic continuously variable speed change device.

Figure 1:
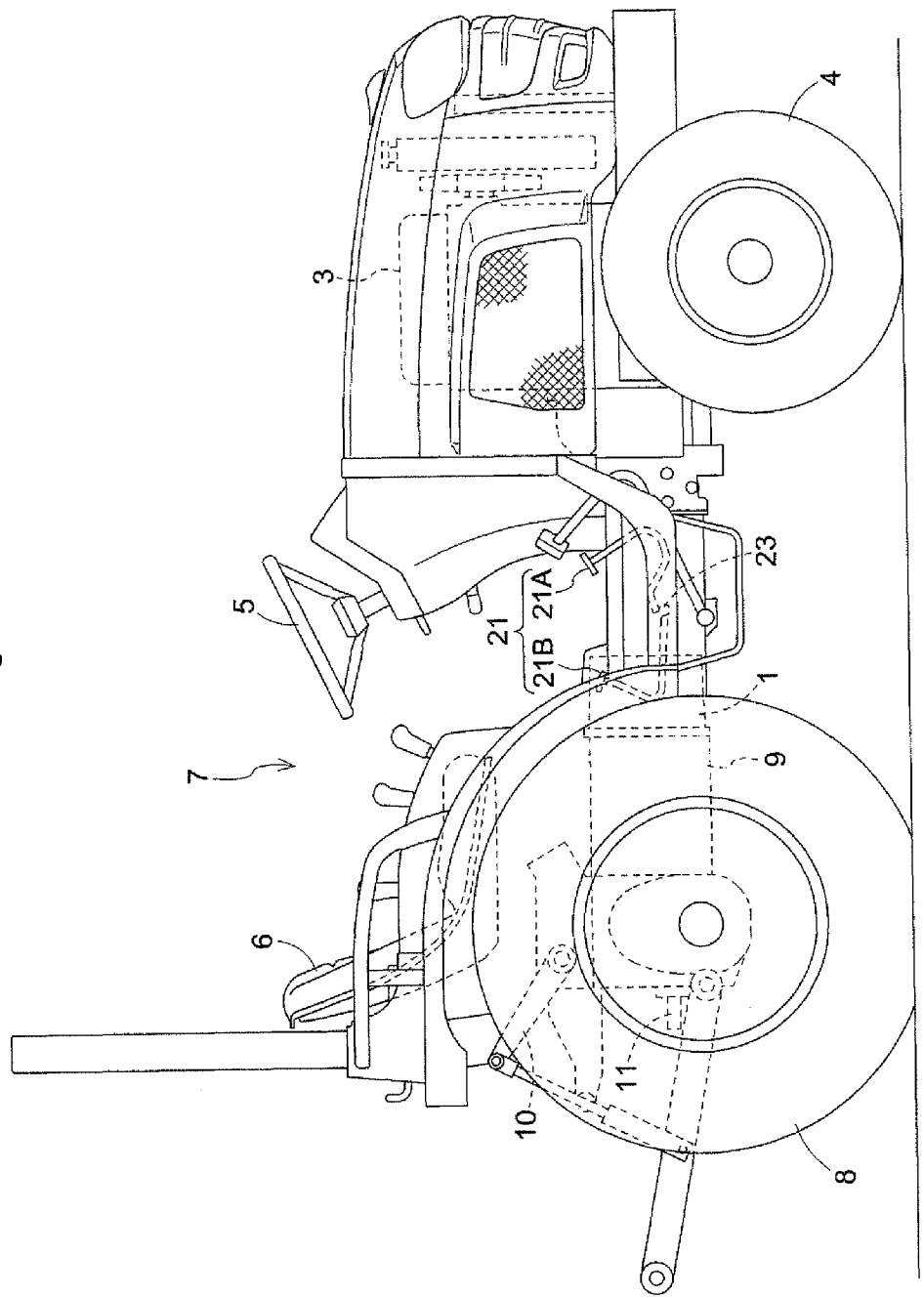
FIG. 1 is a side view showing the entire tractor.

FIG. 1 is a side view showing the entire tractor. As shown in FIG. 1, an engine 3 and other components are mounted at the front of the tractor, and a pair of left and right front wheels 4 driven by the power from the engine 3 is provided so as to be capable of steering. A driver seat 6, a steering wheel 5 linked to the left and right front wheels 4, and other components are provided at the rear of the tractor to form a riding and operating part 7. A pair of left and right rear wheels 8 driven by the power from the engine 3 is provided to the outside on the left and right of the riding and operating part 7. A transmission case 9 or the like provided with a geared speed change device (not shown) for functioning as an internal secondary speed change device, and a hydrostatic continuously variable speed change device (hereinafter abbreviated as HST) 1 for functioning as a primary speed change device, are provided below the riding and operating part 7.

The rear part of the transmission case 9 is provided with a pair of left and right lift arms 10 that pivot up and down by the action of a hydraulic cylinder (not shown) provided inside the transmission case 9; a power takeoff shaft 11 for enabling the power from the engine 3 to be taken off to the outside; and other components. A rotary cultivator, a plow, or another implement can thereby be coupled to the rear part of the tractor so as to be able to be driven, raised, and lowered. The tractor is also configured so that power can be transmitted to a rotary cultivator or other drivable implement.

As shown in FIGS. 2 through 6, the speed of the HST 1 is changed by changing the angle (tilt angle) of a pump swash plate (not shown) provided inside the HST 1. A trunnion shaft 12 oriented to the left and right that enables the tilt angle to change is installed in the HST 1 so that the right end of the trunnion shaft 12 protrudes to the outside on the right of the HST 1. A neutral hold device 2 for enabling the trunnion shaft 12 to return to the neutral position (a pre-set rotation angle position for neutral) N is provided on the right side of the HST 1.

The neutral hold device 2 is provided with a first member 13 that rotates integrally with the trunnion shaft 12, a second member 14 provided immediately in front of the first member so as to be able to pivot forward and backward, a spring 15 for pivotally urging the second member 14 toward the first member 13 to the rear, and other components. A tension spring is employed as the spring 15.

The first member 13 is formed in the shape of a fan, and the proximal end 13A thereof secures the right end part of the trunnion shaft 12 on both sides, whereby the first member 13 is connected to the trunnion shaft 12. A concave cam C that is made concave in a V shape (or U shape) is formed in the front edge 13B of the first member 13. The cross-sectional shape of the right end part of the trunnion shaft 12 is elliptical.

The second member 14 is provided with a boss 14A that fits onto a support shaft 16 so as to be able to rotate in relative fashion, the support shaft 16 is oriented to the left and right and provided parallel to the trunnion shaft 12, and the second member 14 pivots forward and backward about the support shaft 16. A cam follower 17 for engaging with the cam C is provided to the free end of the second member 14.

The spring 15 is linked toward the front and rear between the free end of the second member 14 and a bracket 18 provided to the transmission case 9. The spring 15 thereby pivotally urges the second member 14 toward to the first member 13 so that the cam follower 17 faces the bottom of the cam C.

The support shaft 16 is connected by a bolt 19 to a bracket 20 provided to the HST 1, so that a center shaft 16a of the support shaft 16 can change position about the bolt 19. Through this configuration, when the cam follower 17 is positioned at the bottom of the cam C, the set position of the support shaft 16 as the pivotal support of the second member 14 can easily be changed so as to place the trunnion shaft 12 in the neutral position N.

In other words, the neutral hold device 2 is substantially configured so that the second member 14 is pivoted toward the first member 13 by the urging of the spring 15 so that the cam follower 17 faces the bottom of the cam C, whereby the trunnion shaft 12 is returned to the neutral position N, and the HST 1 is placed in the neutral state.

Figure 2:
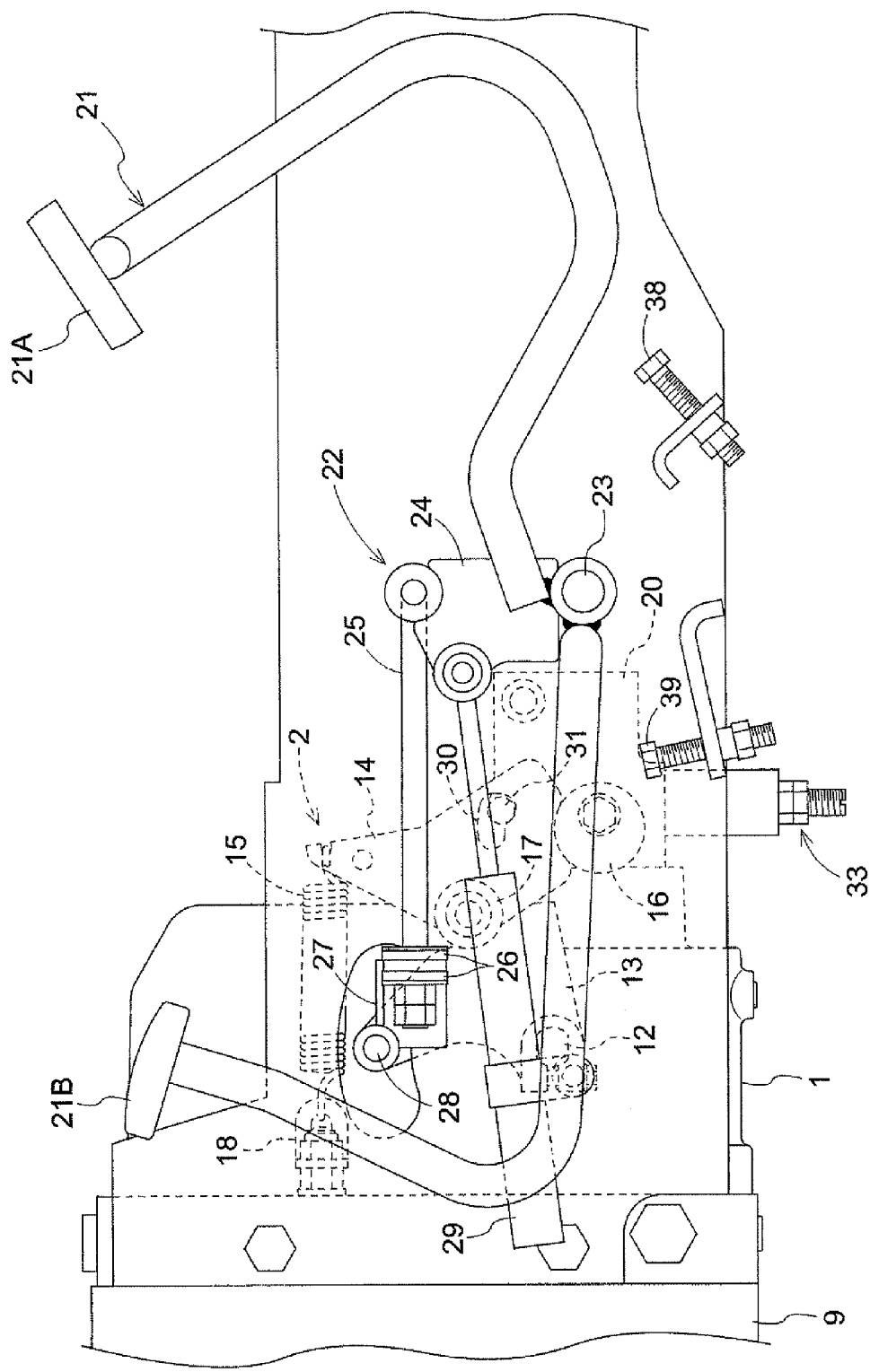
FIG. 2 is a side view showing the relevant parts of the speed change operation structure of the hydrostatic continuously variable speed change device.
Figure 5:
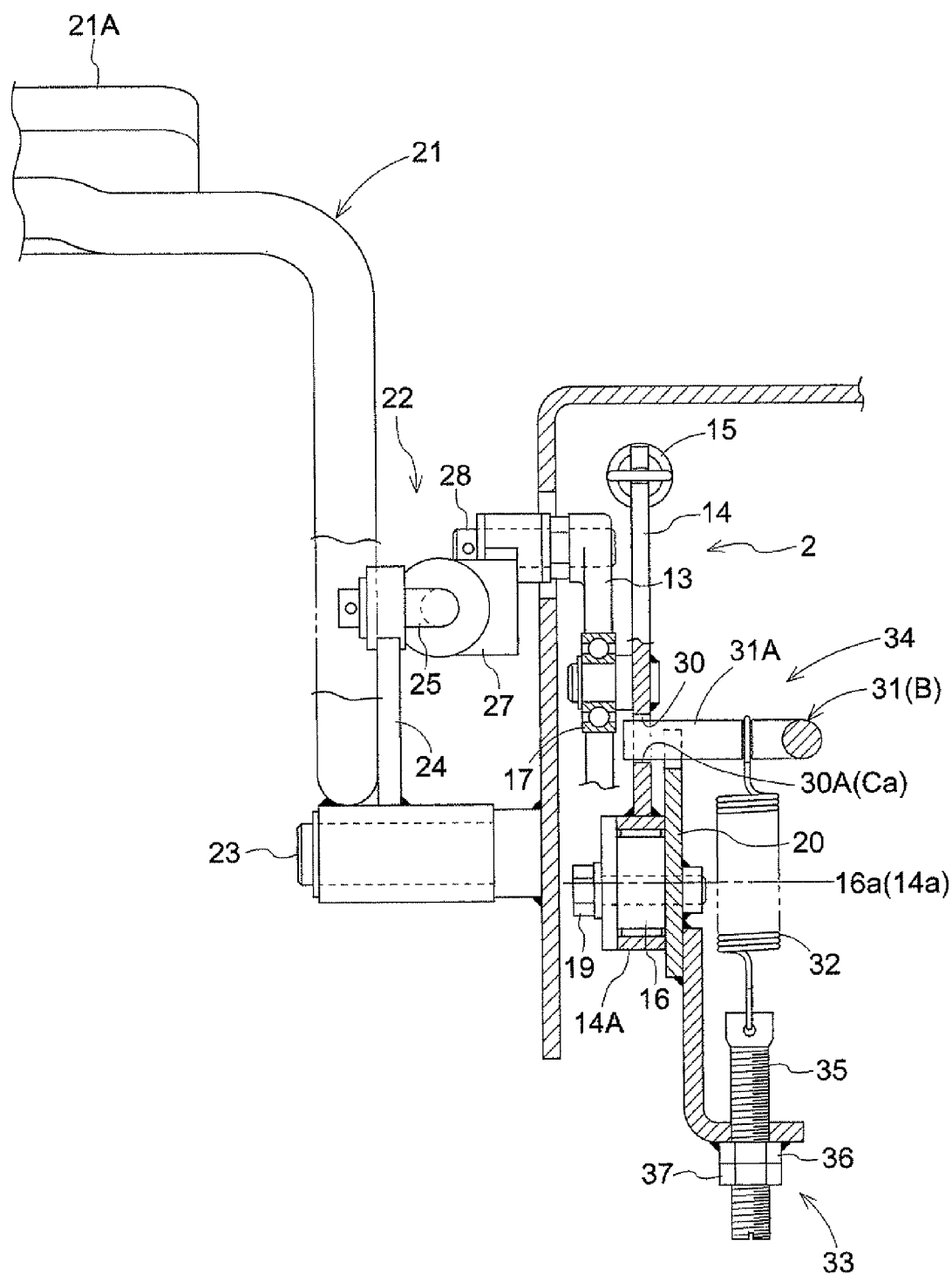
FIG. 5 is a longitudinal sectional front view showing the relevant parts of the structure of the neutral hold device and the auxiliary urging means.
Figure 6:
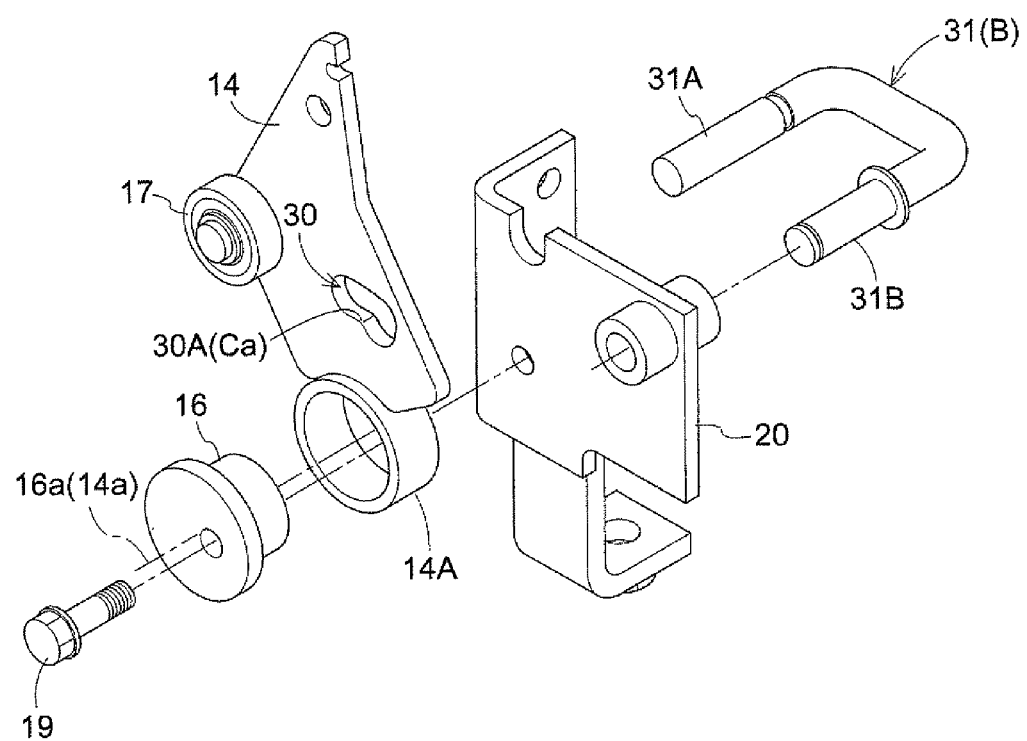
FIG. 6 is an exploded perspective view showing the relevant parts of the structure of the neutral hold device and the auxiliary urging means.

As shown in FIGS. 1, 2, and 5, the first member 13 is linked via a linking mechanism 22 to a speed change pedal 21 provided to the right side of the riding and operating part 7. The speed change pedal 21 is provided with a front pedal operating part 21A for forward speed change, and a rear pedal operating part 2113 for reverse speed change, and the speed change pedal 21 is pivoted in the manner of a balance about a left-right oriented support shaft 23 as a pivot support by the depression of the pedal operating parts 21A, 21B and the action of the neutral hold device 2.

As shown in FIGS. 2 and 5, the linking mechanism 22 is composed of a first arm 24 for pivoting integrally with the speed change pedal 21; a linking rod 25 in which one end thereof pivots on the first arm 24; a second arm 27 linked to the other end of the linking rod 25 via a pair of front and rear rubber isolators 26; a left-right-oriented connecting shaft 28 for connecting the second arm 27 to the first member 13; and other components.

According to this configuration, by pushing the front pedal operating part 21A of the speed change pedal 21 against the action of the neutral hold device 2, a forward speed change can be effected in the HST 1 that corresponds to the extent to which the speed change pedal 21 is pushed. Conversely, by pushing the rear pedal operating part 21B of the speed change pedal 21 against the action of the neutral hold device 2, a reverse speed change can be effected in the HST 1 that corresponds to the extent to which the speed change pedal 21 is pushed. By releasing the pushing of the speed change pedal 21, the speed change pedal 21 is returned to the neutral position through the action of the neutral hold device 2, and the HST 1 can be placed in the neutral state.

The reference numeral 29 in FIG. 2 refers to a damper for preventing the HST 1 from being abruptly switched to the neutral state by the action of the neutral hold device 2.

As shown in FIGS. 2 through 9, a circular cam hole 30 having the center 14a of the boss 14A at the center thereof is formed in the second member 14. One end 31A of a rod 31 that is curved in a U shape is engaged in the cam hole 30. The rod 31 is supported by the bracket 20 so as to pivot vertically about the other end 31B thereof as a left-right-oriented support shaft. One end of an auxiliary spring 32 for pivotally urging the rod 31 downward is hooked to one end 31A of the rod 31. A tension spring is employed as the auxiliary spring 32. The other end of the auxiliary spring 32 is connected to the bracket 20 via an adjusting means 33.

A tilted part 30a that is tilted upward and to the rear at a prescribed angle, and a circular part 30b having the center 14a of the boss 14A at the center thereof are formed in sequence in the front-rear direction in the lower edge 30A of the cam hole 30.

Figure 3:
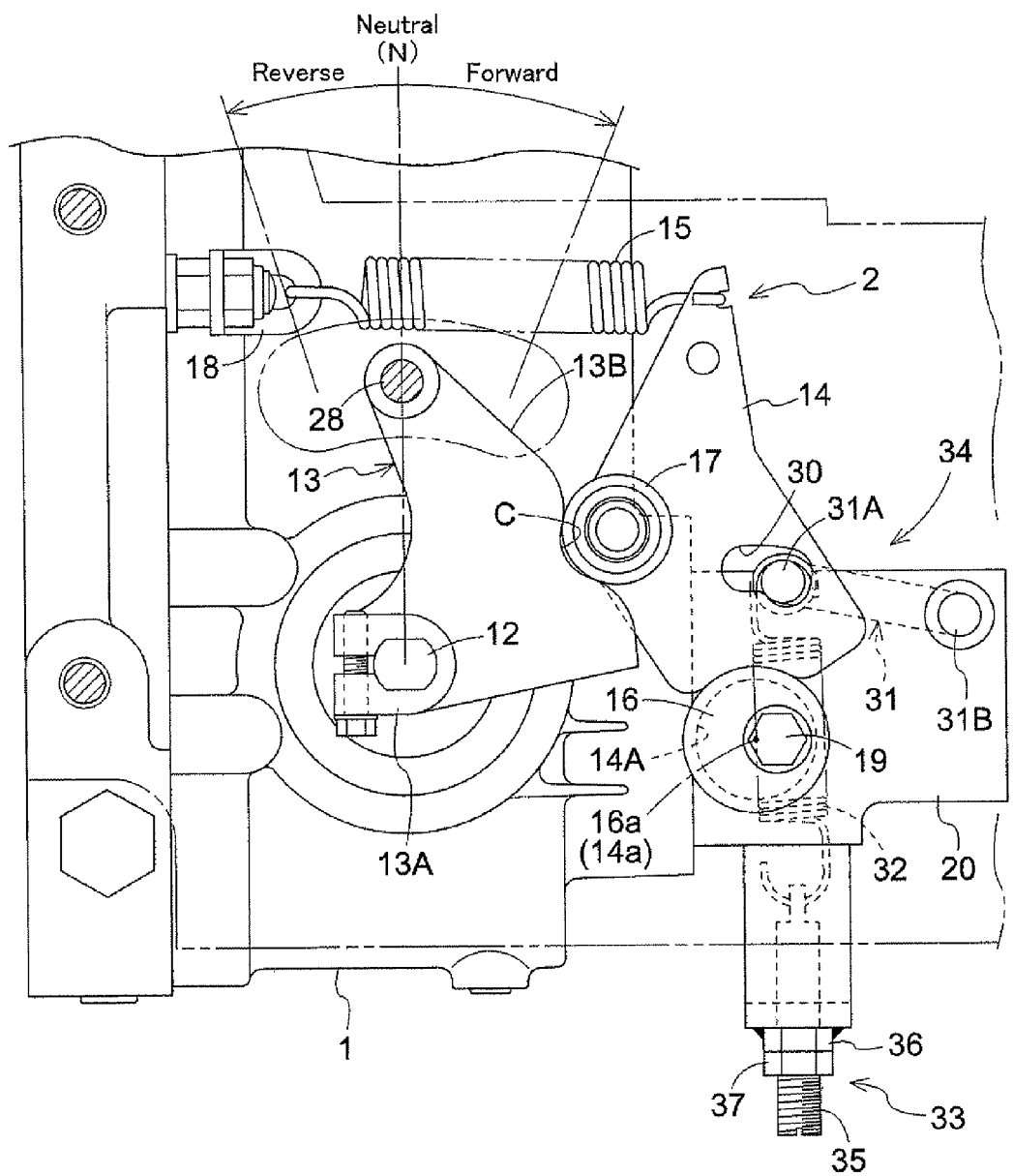
FIG. 3 is a longitudinal sectional side view showing the relevant parts in the state of the neutral hold device and the auxiliary urging means when the trunnion shaft is in the neutral position.
Figure 7:
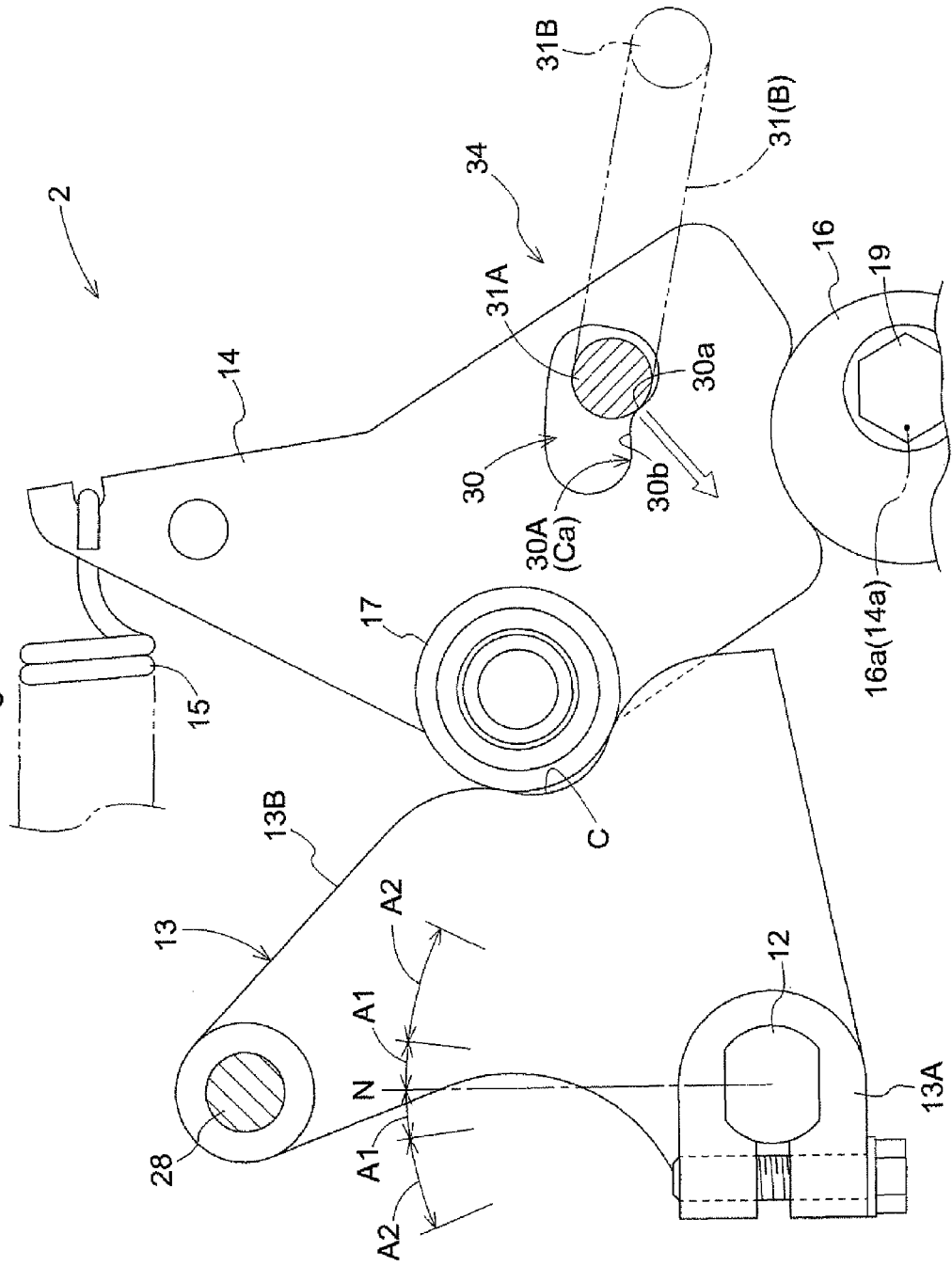
FIG. 7 is a longitudinal sectional side view showing the relevant parts in the operation of the auxiliary urging means when the trunnion shaft is in the neutral position.
Figure 8:
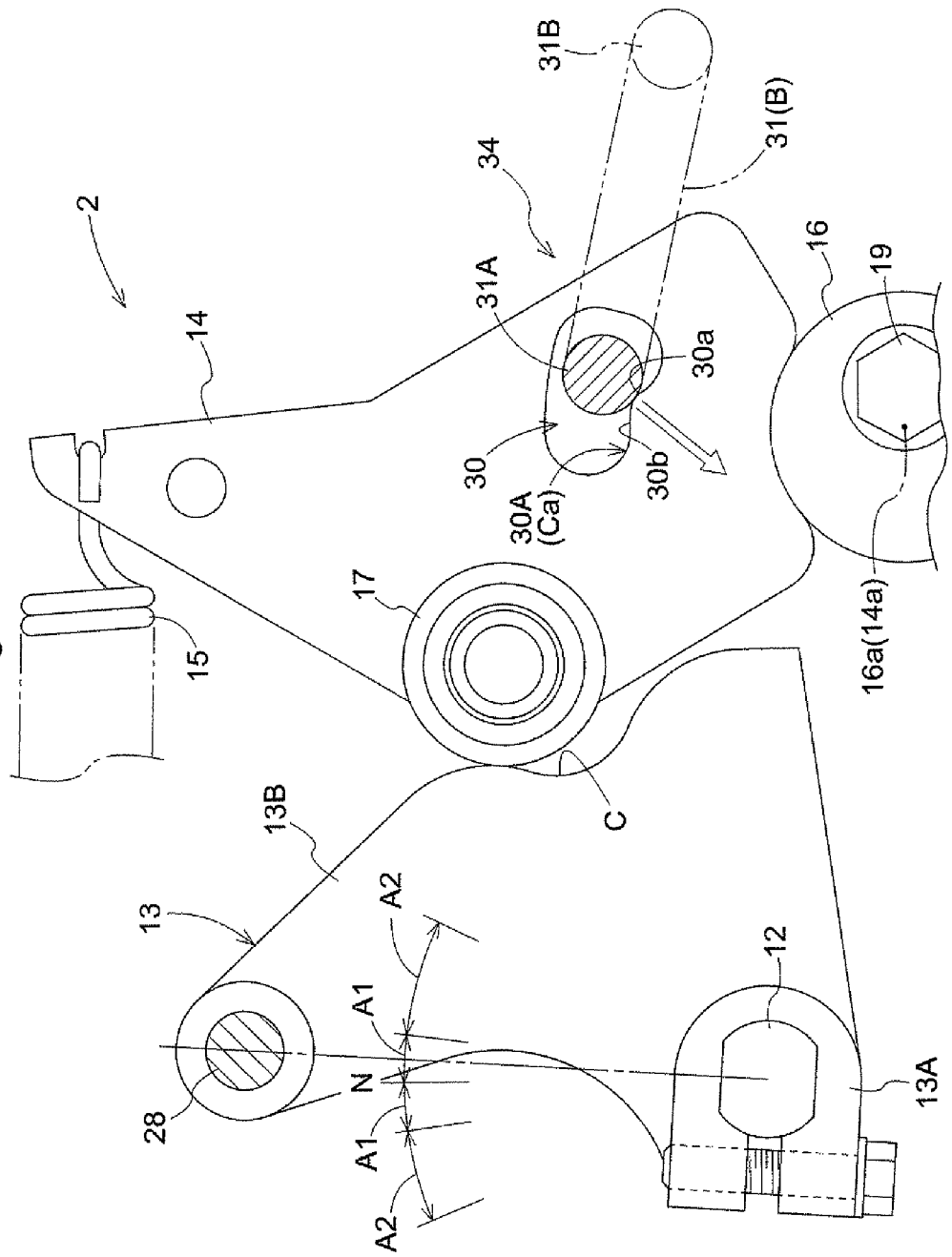
FIG. 8 is a longitudinal sectional side view showing the relevant parts in the operation of the auxiliary urging means when the trunnion shaft is in a proximate region.
Figure 9:
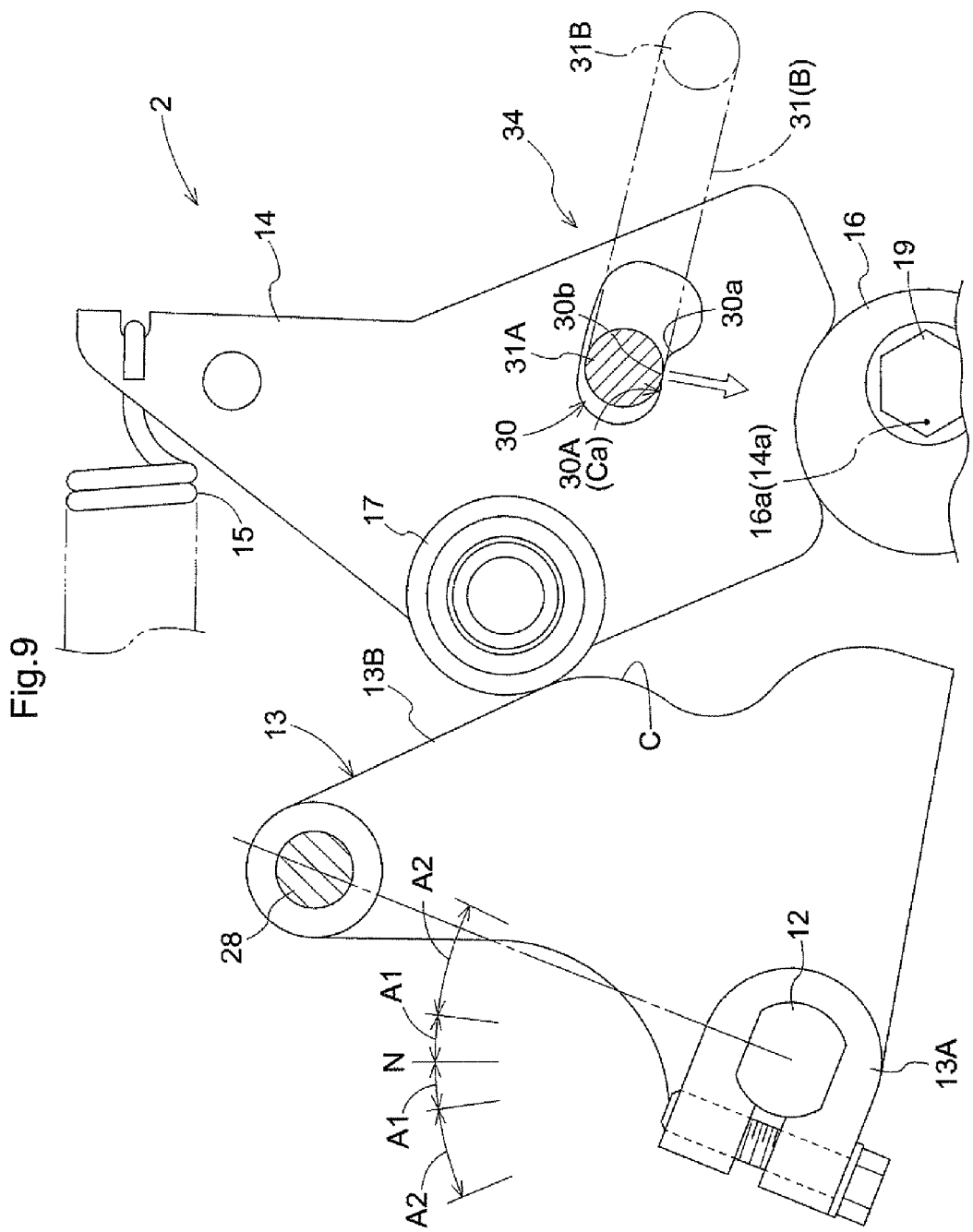
FIG. 9 is a longitudinal sectional side view showing the relevant parts in the operation of the auxiliary urging means when the trunnion shaft is in the separated region.

The tilted part 30a is formed in a prescribed position of the lower edge 30A so as to be pressed by one end 31A of the rod 31 by the urging of the auxiliary spring 32 when the trunnion shaft 12 is positioned in the neutral position N and the proximate region A1 of the pre-set neutral position N (see FIGS. 3, 7, and 8). The circular part 30b is formed at the rear part of the lower edge 30A so that one end 31A of the rod 31 is pressed by the urging of the auxiliary spring 32 when the trunnion shaft 12 is positioned in a separated region A2 that is farther from the neutral position N than the proximate region A1 (see FIGS. 4 and 9).

According to the configuration described above, while the trunnion shaft 12 is in the neutral position N, the one end 31A of the rod 31 makes contact with the tilted part 30a through the urging of the auxiliary spring 32 and pushes the second member 14 toward the first member 13. The second member 14 therefore receives the urging force of the auxiliary spring 32 and the urging force of the spring 15, and the cam follower 17 is maintained in position at the bottom of the cam C. In other words, while the trunnion shaft 12 is in the neutral position N, the urging force of the spring 15 and the urging force of the auxiliary spring 32 act on the trunnion shaft 12 as retaining forces that retain the trunnion shaft 12 in the neutral position N (see FIGS. 3 and 7).

The one end 31A of the rod 31 also makes contact with the tilted part 30a through the urging of the auxiliary spring 32, and pushes the second member 14 toward the first member 13 when the trunnion shaft 12 is positioned in the proximate region A1. The second member 14 therefore receives the urging force of the auxiliary spring 32 and the urging force of the spring 15 at this time, and the cam follower 17 pivots toward the first member 13 so as to face the bottom of the cam C. The first member 13 integrally rotates toward the neutral position N along with the trunnion shaft 12 in conjunction with the pivoting of the second member 14. In other words, while the trunnion shaft 12 is positioned in the proximate region A1, the urging force of the spring 15 and the urging force of the auxiliary spring 32 act on the trunnion shaft 12 as urging forces that urge the trunnion shaft 12 toward the neutral position N (see FIG. 8).

While the trunnion shaft 12 is positioned in the separated region A2, the one end 31A of the rod 31 makes contact with the circular part 30b through the urging of the auxiliary spring 32 and pushes the second member 14 toward the center 14a of the boss 14A. Therefore, the second member 14 is not pivoted by the urging force of the auxiliary spring 32 at this time, and the cam follower 17 also does not face toward the bottom of the cam C. In other words, while the trunnion shaft 12 is positioned in the separated region A2, only the urging force of the spring 15 acts on the trunnion shaft 12 as an urging force that urges the trunnion shaft 12 toward the neutral position N (see FIGS. 4 and 9).

In short, in the configuration described above, the auxiliary spring 32, the rod 31, and the lower edge 30A of the cam hole 30 constitute an auxiliary urging means 34 that generates an auxiliary retaining force for retaining the trunnion shaft 12 in the neutral position N from the urging force of the auxiliary spring 32 to increase the retaining force for retaining the trunnion shaft 12 in the neutral position N while the trunnion shaft 12 is in the neutral position N, and that generates an auxiliary urging force for urging the trunnion shaft 12 toward the neutral position N from the urging force of the auxiliary spring 32 and increases the urging force for urging the trunnion shaft 12 toward the neutral position N while the trunnion shaft 12 is in the proximate region A1.

The lower edge 30A of the cam hole 30 functions as an auxiliary cam Ca for generating an auxiliary retaining force from the urging force of the auxiliary spring 32 while the trunnion shaft 12 is in the neutral position N, generating an auxiliary urging force from the urging force of the auxiliary spring 32 while the trunnion shaft 12 is positioned in the proximate region A1, and acting so as not to generate an auxiliary urging force from the urging force of the auxiliary spring 32 while the trunnion shaft 12 is positioned in the separated region A2.

The rod 31 is a contacting member B that is brought into contact with the auxiliary cam Ca by the urging of the auxiliary spring 32.

Through this configuration, when the operation of the speed change pedal 21 is withdrawn, even when reduction of the urging force of the spring 15 due to use and passage of time, increased viscosity of the hydraulic oil due to reduced ambient temperature, and other effects make it difficult to return the trunnion shaft 12 to the neutral position N merely by the urging force of the spring 15, the urging force of the auxiliary spring 32 is applied to the trunnion shaft 12 that has been returned to the proximate region A1 by the urging force of the spring 15. As a result, the trunnion shaft 12 can be reliably returned to the neutral position N regardless of reduction of the urging force of the spring 15 due to passage of time, increased viscosity of the hydraulic oil of the HST 1 due to reduced ambient temperature, and other effects.

The urging force of the auxiliary spring 32 acts on the trunnion shaft 12 only while the trunnion shaft 12 is positioned in the neutral position N and the proximate region A1. Therefore, the speed change operation of the HST 1 is stiffened by the urging force of the auxiliary spring 32 during the initial period of the speed change from the neutral position N, in which the trunnion shaft 12 is positioned in the proximate region A1, to the separated region A2, but the stiffening of the speed change operation of the HST 1 due to the urging force of the auxiliary spring 32 can be prevented from occurring while the trunnion shaft 12 is positioned in the separated region A2.

As a result, the inconvenience that occurs when the HST 1 can no longer be placed in the neutral state because of changes over time, reduced ambient temperature, and other effects can be effectively prevented without reducing the operability of the HST 1.

Figure 4:
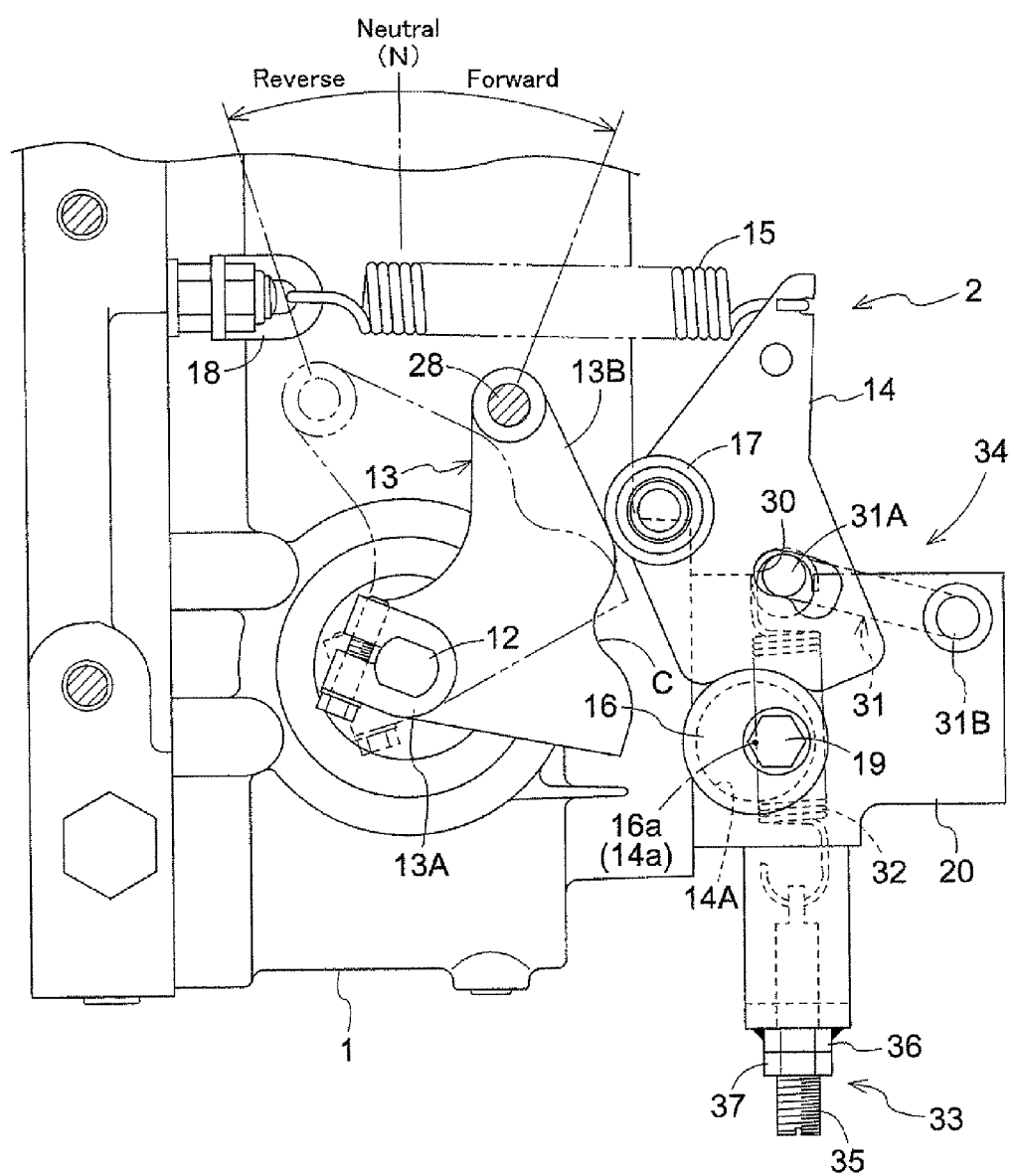
FIG. 4 is a longitudinal sectional side view showing the relevant parts in the state of the neutral hold device and the auxiliary urging means when the trunnion shaft is in the separated region.

As shown in FIGS. 3 through 5, the adjusting means 33 is composed of a screw 35 in which the other end of the auxiliary spring 32 is fastened to one end thereof, a nut 36 welded to the bracket 20, and a lock nut 37 for preventing the screw 35 from turning in relation to the nut 36, and is configured so that the urging force of the auxiliary spring 32 can be adjusted by adjusting the length of the screw 35 that protrudes upward from the nut 36.

The reference numeral 38 in FIG. 2 refers to a bolt that makes it possible to change the set operating limit position in the forward acceleration direction of the speed change pedal 21. The reference numeral 39 in FIG. 2 refers to a bolt that makes it possible to change the set operating limit position in the reverse acceleration direction of the speed change pedal 21.

[Modifications]

(1) The neutral hold device 2 of the hydrostatic continuously variable speed change device 1 according to the present invention may be applied to a rice planting machine, a combine, or other vehicle that is provided with a hydrostatic continuously variable speed change device 1.

(2) The neutral hold device may have a cam member that rotates integrally with the trunnion shaft 12 and is provided with an auxiliary cam Ca shaped as a fan shaped and indented in a V shape on the external periphery thereof, a contacting member B for coming in contact with the cam member, and an auxiliary spring 32 for urging the contacting member B into contact with the cam member. An auxiliary urging means 34 may be composed of the auxiliary cam Ca of the cam member, the contacting member B, and the auxiliary spring 32, and may be set so that in the period in which the trunnion shaft 12 is positioned in the proximate region A1, the contacting member B makes contact with the auxiliary cam Ca, whereby the urging force of the auxiliary spring 32 functions as an auxiliary urging force for urging the trunnion shaft 12 toward the neutral position N, and so that in the period in which the trunnion shaft 12 is positioned in the separated region A2, the contacting member B does not make contact with the auxiliary Ca, whereby the urging force of the auxiliary spring 32 does not function as an auxiliary urging force for urging the trunnion shaft 12 toward the neutral position N.

(3) In another possible configuration, the neutral hold device has a cam member that pivots integrally with the second member 14 about the support shaft 16 and is provided with an auxiliary cam Ca formed so that a tilted part that is tilted upward and to the rear at a prescribed angle, and a circular part centered on the center shaft 16a of the support shaft 16, are formed in sequence in the front-rear direction. The device also has a contacting member B for coming in contact with the cam member, and an auxiliary spring 32 for urging the contacting member B into contact with the cam member. An auxiliary urging means 34 is composed of the auxiliary cam Ca of the cam member, the contacting member B, and the auxiliary spring 32, and is set so that in the period in which the trunnion shaft 12 is positioned in the proximate region A1, the contacting member B makes contact with the tilted part of the auxiliary cam Ca, whereby an auxiliary urging force for urging the trunnion shaft 12 toward the neutral position N is generated from the urging force of the auxiliary spring 32, and so that in the period in which the trunnion shaft 12 is positioned in the separated region A2, the contacting member B makes contact with the circular part of the auxiliary cam Ca, whereby an auxiliary urging force is not generated from the urging force of the auxiliary spring 32.

(4) A tilted part 30a that is tilted upward and to the rear at a prescribed angle, and a circular part 30b centered on the center 14a of the boss 14A may be formed in sequence in the front-rear direction in the outer edge of the second member 14, and an auxiliary cam Ca may be provided to the second member 14.

(5) A cam member in which a tilted part 30a that is tilted upward and to the rear at a prescribed angle, and a circular part 30b centered on the center 14a of the boss 14A are formed in sequence in the front-rear direction may be attached to the second member 14.

(6) The auxiliary urging means 34 may be set so that, for example, one end 31A of the rod 31 is brought into contact with the bottom edge of the front end of a cam hole 30 by the urging of the auxiliary spring 32 while the trunnion shaft 12 is in the neutral position N, and the second member 14 is pushed toward the center 14a of the boss 14A, whereby only the urging force of the spring 15 acts on the trunnion shaft 12 as a retaining force for retaining the trunnion shaft 12 in the neutral position N.

(7) Compression springs, helical springs, or the like may be employed as the spring 15 and the auxiliary spring 32.

(8) Various modifications of the proximate region A1 of the neutral position N are possible according to the type, urging force, and other characteristics of the employed spring 15.

(9) The adjusting means 33 may be composed of a rod engaged at one end thereof with the other end of the auxiliary spring 32; a locking pin removably inserted in the other end of the rod; and a plurality of washers that can be installed between the locking pin and the bracket 20, wherein the urging force of the auxiliary spring 32 can be adjusted by changing the number of washers installed between the locking pin and the bracket 20.

What is claimed is:

1. A neutral hold device for a hydrostatic continuously variable speed change device having a trunnion shaft, comprising:
- a first member which rotates integrally with said trunnion shaft and in which a cam having a concave part is formed;
- a second member that pivots about a support shaft provided parallel to said trunnion shaft, and that is provided with a cam follower for engaging with said cam;
- a spring for urging said cam follower against said cam so that said trunnion shaft is retained in a neutral position by said cam follower being positioned in a set position of said cam by the urging of said spring; and
- auxiliary urging means for generating an auxiliary urging force for urging said trunnion shaft toward said neutral position while said trunnion shaft is positioned in a proximate region of said neutral position set in advance,
- wherein said auxiliary urging means is configured so as to generate said auxiliary urging force by pivotally urging said second member so that said cam follower is urged toward said set position of said cam while said trunnion shaft is positioned in said proximate region; and
- wherein said auxiliary urging means is configured so as not to generate said auxiliary urging force while said trunnion shaft is not positioned in said proximate region.

2. The device according to claim 1, wherein said auxiliary urging means has an auxiliary cam formed in said second member;
- a contacting member for coming in contact with the auxiliary cam; and an auxiliary spring for urging the contacting member toward said auxiliary cam.

3. The device according to claim 1, further comprising adjustable means for adjusting said auxiliary urging force.

* * * * *